United States Patent [19]

Mirra et al.

[11] Patent Number: 4,599,279
[45] Date of Patent: Jul. 8, 1986

[54] ZINC ALLOY FOR REDUCING COPPER-ZINC DIFFUSION

[75] Inventors: Michael J. Mirra; Jon W. Headrick; Raymond E. Giuliani, all of Greeneville, Tenn.

[73] Assignee: Ball Corporation, Muncie, Ind.

[21] Appl. No.: 656,129

[22] Filed: Oct. 1, 1984

[51] Int. Cl.$^4$ .............................................. B32B 15/01
[52] U.S. Cl. ................................... 428/658; 428/674; 428/926; 428/935; 420/515; 420/516; 204/44
[58] Field of Search ............... 428/658, 674, 926, 935; 204/44; 420/515, 516; 72/359; 40/27.5

[56] References Cited

U.S. PATENT DOCUMENTS

| | | | |
|---|---|---|---|
| 2,102,869 | 12/1937 | Winter | 420/516 |
| 2,169,441 | 8/1939 | Winter et al. | 420/516 |
| 2,195,566 | 4/1940 | Gifford et al. | 420/519 |
| 2,657,176 | 10/1953 | Berman et al. | 204/44 |
| 3,037,859 | 6/1962 | Larrieu | 420/516 |
| 3,585,010 | 6/1971 | Luce et al. | 204/44 |
| 3,676,115 | 7/1972 | Hare et al. | 420/519 |
| 3,734,785 | 5/1973 | Watson et al. | 420/516 |
| 3,790,373 | 2/1974 | Pelzel | 420/540 |
| 3,798,028 | 3/1974 | Gervais et al. | 420/516 |
| 3,850,622 | 11/1974 | Balliett | 420/516 |
| 3,932,143 | 1/1976 | Marshall et al. | 428/658 |
| 4,095,014 | 6/1978 | Iosso | 428/658 |
| 4,126,450 | 11/1978 | Lathrop et al. | 420/516 |
| 4,273,837 | 6/1981 | Coll-Palagos | 428/658 |
| 4,279,968 | 7/1981 | Ruscoe et al. | 40/27.5 |

FOREIGN PATENT DOCUMENTS 2909542 9/1980 Fed. Rep. of Germany ...... 420/516

OTHER PUBLICATIONS

W. O. Allread, *Plating*, 49, 46–49 (1962).
H. J. Read et al., *Plating*, 153–154, Feb. 1970.
H. J. Read et al., *Plating*, 309–315, Apr. 1972.

*Primary Examiner*—L. Dewayne Rutledge
*Assistant Examiner*—Robert L. McDowell
*Attorney, Agent, or Firm*—Gilbert E. Alberding

[57] ABSTRACT

A zinc alloy, having a copper layer coated thereon, consists essentially of from about 0.1 to about 0.8 weight percent copper, about 0.01 or more weight percent aluminum; up to about 0.05 weight percent magnesium, the balance being essentially zinc. The copper coated zinc alloy is advantageously employed to produce various cast, extruded, molded articles and the like including trim, fixtures as well as coin blanks. Further, the present invention relates to a metal article comprising a zinc base alloy having a copper overlayer in direct contact with the zinc base alloy, said alloy comprising about 1.5 weight percent or less aluminum and the remainder zinc. From another aspect, the subject invention contemplates a method for reducing the diffusion between a copper layer and a zinc base metal, said layer being in direct contact with the zinc base metal, said method comprising incorporating at least about 0.01 weight percent aluminum in said zinc base metal. The invention also contemplates a method for reducing the interdiffusion between a copper electroplate bonded to an underlying zinc metal comprising alloying said zinc metal with about 0.1 to about 0.8 weight percent copper, about 0.01 or more weight percent aluminum, about 0.003 to about 0.05 weight percent magnesium, the balance being essentially zinc, said copper electroplate having a thickness of at least of about 0.00001 inch.

13 Claims, 3 Drawing Figures

EFFECT OF ALUMINUM CONTENT IN ZINC ALLOYS ON COPPER ZINC DIFFUSIVITY
(COPPER PLATED ZINC ALLOY BLANKS)

EFFECT OF ALUMINUM CONTENT IN ZINC ALLOYS
ON COPPER ZINC DIFFUSIVITY
(COPPER PLATED ZINC ALLOY BLANKS)

ZINC ALLOY FOR REDUCING COPPER-ZINC DIFFUSION

The present invention relates to a zinc alloy having coated, plated or otherwise deposited thereon a copper layer wherein the rate of diffusion between the zinc alloy and copper layer is significantly reduced. More especially, this invention relates to a zinc alloy containing a minor amount of aluminum, said zinc alloy having good formability and machinability that can be readily electroplated with copper, the plated article showing substantially reduced zinc-copper interdiffusion.

BACKGROUND OF THE INVENTION

Many articles of commerce are made of zinc and are generally produced as zinc die castings or formed from sheet using rolled zinc alloys. To enhance the decorative features of articles made from zinc alloys or to improve their corrosion resistant properties, it is common practice to coat the zinc part with other metals. This is normally accomplished through electroplating of other metals onto the surface of the zinc article. The metals most commonly electrodeposited onto zinc surfaces to achieve these ends are copper, nickel, chromium, tin or brass.

Because of the relative anodic position of zinc in the electromotive series, most metals, with the exception of copper, cannot practically be electroplated directly over zinc. The usual practice in the art is to first deposit the copper onto a zinc surface and followed, if desired, by plating other metals (e.g., nickel, chromium, tin, etc.) over the copper. The electrodeposition of copper onto zinc surfaces is normally accomplished by using alkaline copper plating baths based on copper cyanide or pyrophosphates.

The fidelity of a finished plating involving one metal over another depends on many variables. One of the most important factors being the condition of the interface between the plated metal and its substrate. For example, if the surface of the substrate is not properly prepared or cleaned prior to plating, then poor adhesion or incomplete coverage of the plating can occur. This is true not only for plating copper over zinc but for any plating system and is emphasized to indicate the importance of the interface on the quality and stability of a plated system. However, with the plating of copper over zinc alloys another factor which can effect the stability or longer term fidelity of a given product and must be considered is related to the occurrence of interdiffusion of the copper plate and the zinc substrate.

It is known that when copper and zinc are placed in intimate contact, as is the case in electroplating, that both metals tend to diffuse into each other and to give raise to a diffusion layer. For example, one study by W. O. Allread and reported in Plating 49, 46 (1962) describes substantial diffusion taking place between a copper electroplate and a zinc die cast substrate occuring at 350°–365° F., and in relatively short times. Diffusion also occurs at room temperature but at a slower rate. It is also indicated by Allread that the resultant diffusion zone or layer consists of a brittle brass alloy and can be a potential source of spalling failure of the plating.

It can be appreciated that the thickness of the diffusion layer formed between a copper electroplate and a zinc substrate is dependent on the time and temperature the different metals are in contact after plating. In fact, with enough time and temperature exposure all of the copper of the original plating would be consumed or absorbed through the diffusion process. When this occurs the zinc substrate will "show-through" the copper plate effecting not only the appearance of the plated article but also its corrosion properties. If other metals (e.g., nickel, chromium) are plated over the copper, spalling or flaking of the plated part generally also occurs which in turn effects both its appearance and corrosion properties.

In order to assure the fidelity of a plated zinc part through its intended life, it is important to provide enough copper plate thickness to more than accommodate expected diffusion throughout the life of the part. To establish copper plate thickness requirements it is necessary to identify the variables which can effect the interdiffusion rates of copper plated zinc article. Expected temperature exposure of the plated article is an important variable effecting diffusion rates and must be considered in determining copper plate thickness requirements. However, other factors of a plating system can also effect the interdiffusion rates, and one of these, namely the composition of the zinc alloy, is the subject of the current invention.

If temperature were the only variable effecting the rates of diffusion in a copper-plated zinc part then providing enough copper plate thickness would be the only viable method of assuring fidelity of the plated part throughout its intended life. However, it has been shown that, independent of temperature, other variables related to the plated article can also effect the interdiffusion rates. For example, in studies carried out by H. J. Read and W. P. Minnear Plating, Febuary 1970, pp. 153–154 and Plating, April 1972, pp. 309–315, they have shown that surface preparation methods and/or alloy composition of the zinc substrate can also effect diffusion rates. It was further pointed out by these authors that the more heavily alloyed (e.g., 4% aluminum) zinc die castings exhibited a slower interdiffusion rate as compared to pure zinc and typical rolled zinc alloys. In addition, it was also shown that small amounts of alloying constituents typically used in making rolled zinc alloys have little or no effect on the diffusion rates of a copper plated zinc part. It was also suggested in these studies that the aluminum used in the zinc die castings decreased the diffusion rates and the more aluminum used the less the interdiffusion.

In recent years considerable effort has been directed to improving various properties of zinc base alloys. For instance, U.S. Pat. No. 2,102,869 discloses improving the tensile strength, impact strength, machinability and resistance to corrosion of extruded zinc alloys by providing a zinc alloy containing about 10 to about 15 percent aluminum, from about 1.5 to about 4 percent copper and from about 0.01 to about 0.04 percent magnesium, the balance being zinc.

U.S. Pat. No. 2,169,441 discloses improving the workability of a zinc base alloy by providing one containing from about 10 to about 15 percent aluminum, about 1.5 to about 4 percent copper, about 0.01 to about 0.04 percent magnesium, the balance being zinc having a purity of at least 99.98 percent.

U.S. Pat. No. 2,195,566 discloses a photoengraving zinc base alloy plate composition containing from about 0.05 percent to 0.4 percent of aluminum, about 0.0004 percent to 0.009 percent of magnesium and the balance high grade zinc. Aluminum is used in the alloy composition to improve the etching characteristics of the plate.

In U.S. Pat. No. 3,037,859 there is disclosed a zinc base alloy having improved mechanical properties containing from about 0.5 to about 5.0 percent aluminum, about 5 to about 10 percent copper, about 0.005 to about 0.30 percent magnesium, about 0.001 to about 0.30 percent beryllium, the balance being pure zinc.

A zinc base alloy having good machinability, improved corrosion properties and improved mechanical properties is disclosed in U.S. Pat. No. 3,676,115, said alloy containing about 70 to about 82 percent zinc, about 18 to about 30 percent aluminum, about 0.05 to about 0.25 percent magnesium and up to about 2 percent of copper, nickel or silver.

A zinc base alloy forging having improved strength, dimensional stability and impact resistance properties at low temperatures is disclosed in U.S. Pat. No. 3,734,785, the said alloy consisting essentially of about 9 to about 22 percent aluminum, about 0.5 to about 1.5 percent copper, about 0.01 to about 0.03 percent magnesium, the balance being zinc.

U.S. Pat. No. 3,790,373 discloses an aluminum-zinc alloy consisting essentially of about 38 to about 75 percent, 0 to about 0.05 percent magnesium, 0 to about 4.8 percent copper, about 0.05 to about 2.8 percent nickel and the balance being zinc.

Another zinc-aluminum alloy, disclosed as having good machinability and satisfactory corrosion resistance, is described in U.S. Pat. No. 3,798,028, the said alloy comprising about 18 to about 30 percent aluminum, about 0.01 to about 1 percent magnesium, about 0.01 to about 3 percent bismuth, 0 to about 5 percent copper, the balance being zinc.

Still another zinc-aluminum alloy is disclosed in U.S. Pat. No. 3,850,622 which contains about 20 to about 24 percent aluminum, about 0.75 to about 1.1 percent copper, about 0.04 to about 0.05 percent magnesium, about 0.01 to about 0.03 percent of at least one of calcium, lithium and sodium, the balance being zinc.

In U.S. Pat. No. 4,126,450 there is disclosed a castable zinc base alloy described as having highly favorable castability, tensile strength, tensile strength stability, shear strength and platability characteristics. The subject alloy comprises about 4 to about 10 percent aluminum, about 1 to about 6 percent copper, about 0.02 to about 0.04 percent magnesium, the balance being zinc.

U.S. Pat. No. 4,095,014 describes an article of manufacture made from a zinc base metal having a substantially continuous, wear-resistant hard chromium skin layer on at least one surface thereof. The zinc alloys disclosed therein have the following compositions: (1) zinc alloyed with 4 percent aluminum, 0.04 percent magnesium, a maximum of 0.25 percent copper, less than 0.1 percent iron, less than 0.005 percent lead, less than 0.004 percent cadmium and less than 0.003 percent tin; (2) zinc alloyed as in (1) but having 0.75–1.25 percent copper; and (3) an alloy comprising 95 percent zinc, 1.25 percent copper, 3.5 percent aluminum, 0.1 percent iron, 0.02 percent magnesium, 0.005 percent lead, 0.004 percent cadmium and 0.003 percent tin.

In light of the published information on the effects of alloy composition of zinc alloys on interdiffusion rates with copper plate, it was surprising to find that very small additions of aluminum to zinc alloy, especially rolled zinc alloys, had such a profound effect on slowing down the diffusion rates. The achievement of much slower diffusion rates through the addition of very small amounts of aluminum was unexpected and significant. It is particularly significant for rolled zinc alloys where it is important to minimize alloy additions consistent with the achievement of required mechanical and/or chemical properties of the rolled zinc.

While this development finds wide spread applicability, it is particularly advantageous in the field of producing blanks for minting into coins or similar disc-shaped articles, as well as other applications where rolled zinc alloy parts are initially plated with copper then optionally over plated with, for instance, nickel and/or chromium.

SUMMARY OF THE INVENTION

It is therefore an object of the subject invention to provide a novel article and process to substantially curtail diffusion of zinc metals including zinc base metals and copper and copper base metals when such metals are placed in direct contact with one another over any period of time.

Another object of the subject invention is to provide a novel method of substantially reducing interdiffusion of copper atoms and zinc atoms from sources containing the same during their intimate contact as in composite structures including blanks, performs, coins, tokens or similarly disc-shaped articles, especially those suitable for minting and the like.

BRIEF DESCRIPTION OF THE DRAWING

A more detailed description of this invention is given herein below with reference to the attached drawings, wherein.

DESCRIPTION OF THE PREFERRED EMBODIMENTS

Figure 1:
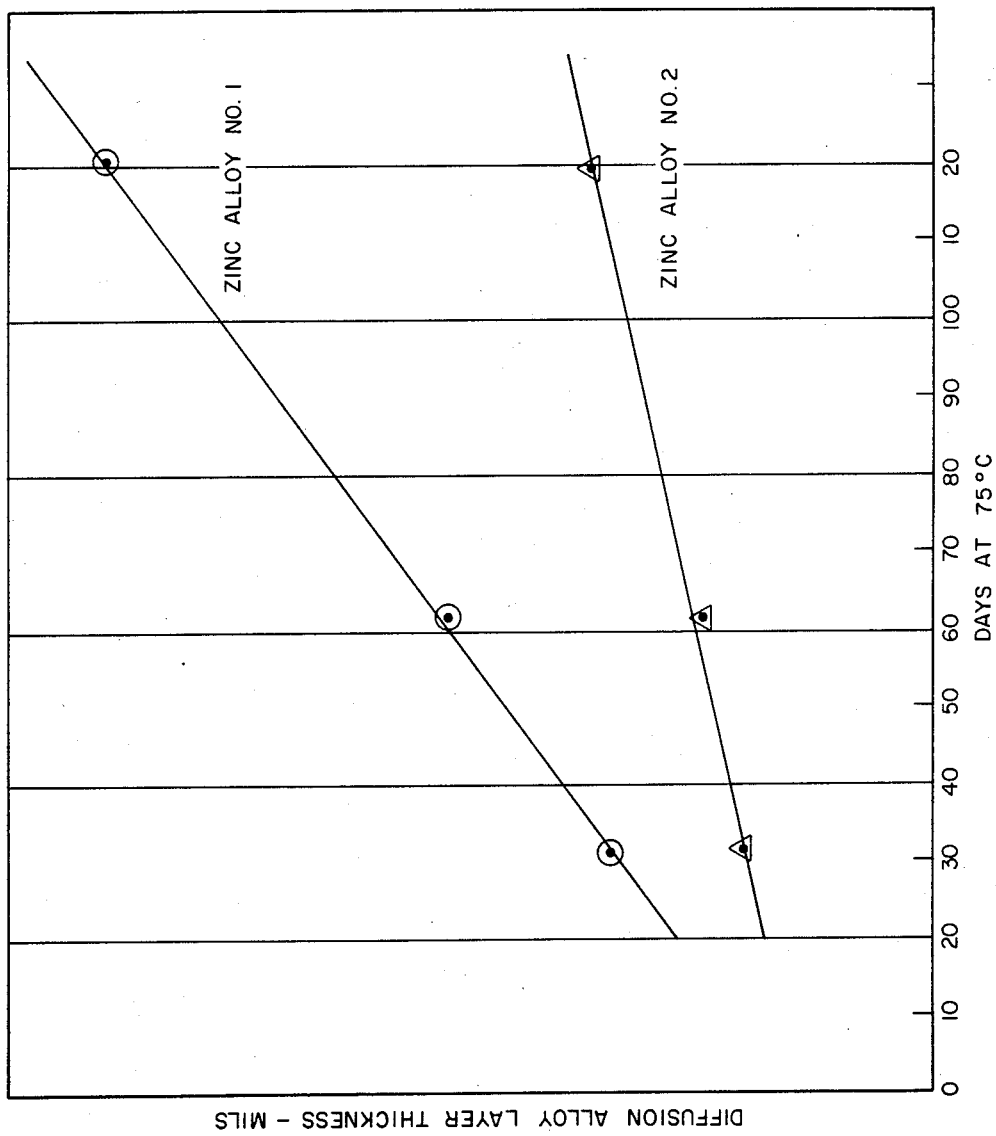
FIG. 1 is a graph showing the diffusion layer growth at 75° C., for copper plated zinc alloy blanks.

Broadly, the subject invention relates method of reducing the interdiffusion of copper and zinc or zinc alloy, said copper being plated over the zinc or zinc alloy, said method comprising incorporating about 1.5 percent or less aluminum by weight into said zinc or zinc alloy. Further, the subject invention relates to a method of substantially reducing the interdiffusion of copper and zinc within respective contacting bodies of the same, said method comprising alloying the zinc with between about 0.02 and about 1.5 weight percent aluminum, and at least one metal selected from the group consisting of copper and magnesium. It has been found that most of the effects of aluminum on diffusion rates is achieved when at least about 0.5 percent is incorporated in the alloy. More aluminum does not seemingly decrease diffusion.

The present invention relates to a zinc alloy having a copper layer deposited or coated thereon, said zinc alloy consisting essentially of about 0.1 to about 0.8 weight percent copper, about 1.5 or less weight percent aluminum, up to about 0.05 weight percent magnesium, the balance being zinc. The copper layer deposited or coated on said zinc alloy may have various thicknesses but generally is a thin coating having a thickness of about 0.0001 to about 0.0005 inch (0.1 to 0.5 mils). It should be appreciated that copper thickness does not effect rate, only the time of show-through.

Further, the present invention relates to a metal composite article comprising a zinc base alloy having a copper overlayer in direct contact with the zinc base alloy, said alloy comprising about 1.5 weight percent or less aluminum and the remainder zinc. From another aspect, the subject invention contemplates a method for reducing the diffusion between a copper layer and a zinc base metal, said copper layer being in direct contact with the zinc base metal, said method comprising incorporating at least about 0.1 aluminum in said zinc base metal. The invention also contemplates a method for reducing the interdiffusion between electroplated copper bonded to an underlying zinc metal, said method comprising alloying said zinc metal with about 0.1 to about 0.8 weight percent copper, about 0.1 or more weight percent aluminum, about 0.003 to about 0.05 weight percent magnesium, the balance being essentially zinc, said electroplated copper having a thickness of about 0.00005 to about 0.004 inch.

The zinc alloy can be formed by intimately mixing the components thereof in molten zinc. The resultant alloy can be cast and thereafter rolled and formed into a wide variety of shapes.

One aspect of the subject invention contemplates the use of said metal for producing various and sundry articles including decorative parts for use in trim, fixtures and the like. From another particular aspect, the present invention relates to a blank suitable for minting into coins or similar disc-shaped articles which comprises a core formed of a zinc alloy material consisting essentially of about 0.1 to about 0.8 weight percent copper, about 0.02 to about 1.5 weight percent aluminum, up to about 0.5 weight percent magnesium, the balance being essentially zinc and a cladding of copper completely encasing said core, said cladding having a thickness of about 0.0001 to about 0.0005 inch or 0.1–0.5 mils.

Preferably, the zinc alloy of this invention contains about 0.2 to about 0.8 weight percent copper, about 0.01 or more weight percent aluminum, about 0.004 to about 0.01 weight percent magnesium, the balance being essentially zinc.

According to the present invention it has been found that coins produced with the zinc alloy blanks as defined above exhibit an extended useful life as measured by the prolonged time lapse before zinc shows through the copper plating. Moreover, decorative parts and articles made in accordance with the subject invention show markedly improved and extended usefulness with maintenance of any decorative overlayers.

To approximate the useful life of a plated blank, diffusion rates were investigated at elevated temperatures and the resulting data then extrapolated to ambient temperature conditions. The diffusion rates were followed by determining the alloy layer growth (optical cross sections) as a function of time and temperature or by noting the time for zinc to show-through as a function of temperature and copper plate thickness. For example, it has been demonstrated that the copper plated (0.2–0.3 mils) over zinc alloys containing no aluminum will be completely interdiffused with the zinc in about 17–25 years at ambient temperatures. Incorporated small amounts of aluminum (e.g. 0.02–0.05% AL) can extend the "show-through" times by slowing down the interdiffusion rates to about 100–300 years. This strong effect on diffusion rates (show-through times) by small amounts of aluminum can be noted in FIG. 2.

The copper overlayer on the zinc or zinc base alloy may be carried out by standard electroplating techniques. Preferably the zinc alloy articles, especially for coinage, of the present invention may be provided with a copper deposit by electroplating the same in electroplating equipment conventionally known as barrel plating apparatus, as disclosed for instance in U.S. Pat. Nos. 2,844,528; 4,089,753 and 4,176,014. Such apparatus includes a nonconducting perforated container or barrel in which the zinc alloy cores are contained. The container is positioned in a bath of plating solution and, during the electroplating operation, the container is moved angularly about a horizontal axis with an anode being located in the plating solution outside the container and a cathode contacting the zinc alloy cores being located with the container. The electroplating is continued until the copper cladding has a thickness of about 0.0002 to 0.0003 inch.

In order to demonstrate the effects of alloy composition of zinc alloys on diffusion rates with the copper plate it is necessary to have test methods capable of generating diffusion rate information. One method which has been used is to expose copper plated zinc parts to elevated constant temperatures and to follow the growth with time of the diffusion layer formed. The thickness of the diffusion layer is measured periodically by optical cross section methods. By determining the rate of alloy layer growth at a series of temperatures will then allow the projections of expected diffusion rates at other temperatures (e.g. ambient).

Another method of establishing diffusion rates, which was predominantly used in the subject investigations, is to expose copper plated zinc parts of known copper plate thickness to elevated constant temperatures and to determine the time required for the copper plate to be totally absorbed by the diffusion process (e.g. zinc show-through). Again by carrying out this process using a series of elevated temperatures, diffusion rate information can be generated allowing for the projection of show-through times for various copper plate thickness and temperatures (e.g., ambient). Details on the methodology used for establishing projected show-through times using this procedure is hereinunder described.

Zinc alloys of varying composition were cast and rolled to produce strip which in turn were plated and then used in the diffusion studies. Circular disc (0.75 inches in diameter) were stamped out of the rolled zinc alloy strip which were then copper plated in barrels using standard cleaning and copper cyanide plating procedures. The thickness of the copper plate was accurately determined using x-ray, optical cross sections and coulimetric techniques. The copper plated zinc blanks of known composition and copper plate thickness were then tested for diffusion rates in the following manner.

A statistically significant number of the copper plated zinc blanks were chosen for each temperature at which the tests were to be conducted, typically three to five different temperatures. The blanks were placed in erlenmeyer flasks such that all the surfaces were completely visible and then are covered with ¼" of light mineral oil to prevent surface discoloration. The flasks were then placed into ovens with very precise temperature control at temperatures below the recrystallation temperature of the zinc. The flasks were monitored at various intervals, dependent upon the specific temperature of the oven, and a time log was kept of the number of blanks which exhibit visual evidence of zinc alloy show-through. The end point of the test at a specific temperature is the time required for 50 percent of the blanks to exhibit zinc alloy show-through. The pertinent data obtained at the completion of the testing cycle is: (1) the thickness of the electrodeposit., (2) the precise temperature at which the testing was conducted; (3) the elapsed time required for show-through on 50 percent of the samples of each temperature tested.

It has been determined elsewhere that the development of the diffusion layer could be mathematically described using non-steady state methodology. The growth of the diffusion layer in the direction of the copper is described at completion by the rate equation $Dt = Kx^n$, where D is diffusivity; t is time in hours; K is an integration constant; x is the initial thickness of copper; and n is the rate exponent. The value of K is determined from error function tables, and for this method is 0.594. The value of n was determined to be 1.5 in previous studies. This allows a value for diffusivity at each testing temperature. The value of diffusivity can be described as a function of temperature by the Arrhenius equation; $\ln D = \ln D_o - (Q/R)(1/T)$, where Q is the activation energy; R is the Boltzmann constant; and T is the absolute temperature. The values of $\ln D_o$ and Q for the equation are determined by regression analysis of the temperature and diffusivities. The diffusivity can then be calculated at room temperature. With diffusivity at room temperature, the time to show-through can be calculated for some constant value of plating thickness.

The above procedures were carried out on a series of copper plated zinc blanks of varying zinc alloy composition and which established the effect of small additions of aluminum to the zinc alloy on interdiffusion rates. Examples showing the effects on diffusion rates of aluminum additions to rolled zinc alloys are outlined below.

The following non-limiting examples are given to illustrate the present invention.

EXAMPLE I

A series of zinc alloys with compositions indicated in Table I were prepared, copper plated, all in the same manner, and then diffusion rates at various elevated temperatures were determined.

TABLE I

| Alloy No. | Zinc Alloy Composition (Wt. %) | | | |
|---|---|---|---|---|
| | Form | Al | Cu | Mg | Zinc |
| 1 | Rolled | 0 | 0.69 | 0 | Remainder |
| 2 | Rolled | 0.10 | 0 | 0.05 | Remainder |
| 3 | Rolled | 0 | 0.16 | 0.004 | Remainder |
| 4 | Rolled | 0.017 | 0.21 | 0.006 | Remainder |
| 5 | Rolled | 0.055 | 0.19 | 0.006 | Remainder |
| 6 | Rolled | 0.096 | 0.20 | 0 | Remainder |
| 7 | Rolled | 0.096 | 0.21 | 0.004 | Remainder |

TABLE I-continued

| Alloy No. | Zinc Alloy Composition (Wt. %) | | | |
|---|---|---|---|---|
| | Form | Al | Cu | Mg | Zinc |
| 8 | Rolled | 0.174 | 0.20 | 0.004 | Remainder |
| 9 | Rolled | 0.710 | 0.23 | 0.003 | Remainder |
| 10 | Rolled | 1.42 | 0.23 | 0 | Remainder |
| 11 | Rolled | 1.38 | 0.25 | 0.003 | Remainder |

[1] Copper plated blanks made from Alloys 1 and 2 indicated in Table I were exposed to a constant temperature of 75° C. (167° F.), for 120 days. Periodically sample blanks were taken and cross sectioned to optically determine the thickness of the diffusion layers. The trend of diffusion layer growth with temperature at 75° C., is indicated in Table II and illustrated in FIG. 1.

TABLE II

| | | Diffusion Layer Thickness (Mils) | |
|---|---|---|---|
| Time | Temperature | Alloy No. 1 | Alloy No. 2 |
| 31 days | 75° C. | 0.42 mils | 0.25 mils |
| 62 days | 75° C. | 0.63 mils | 0.30 mils |
| 120 days | 75° C. | 1.08 mils | 0.45 mils |
| Diffusion layer growth rate (Mils/day) | | $6.7 \times 10^{-3}$ mils/day | $2.2 \times 10^{-3}$ mils/day |

The rates of alloy layer growth indicated in Table II shows that at 75° C., that copper plated blanks made from Alloy 1 exhibited over three times the diffusion rate compared to Alloy 2. It should be noted that Alloy 2 contains 0.1% aluminum and Alloy 1 contains none.

EXAMPLE II

Zinc blanks made from the alloys listed in Table I were copper plated, all in the same manner and then exposed to varying temperatures to determine the time for zinc show-through to occur. As indicated above, by knowing the copper plate thickness, temperatures and average show-through times, the diffusivity and projected show-through times, at ambient temperatures (77° F.) can be calculated. The experimental data and associated calculated values for a series of diffusion (show-through) trials are outlined in Table III.

Figure 2:
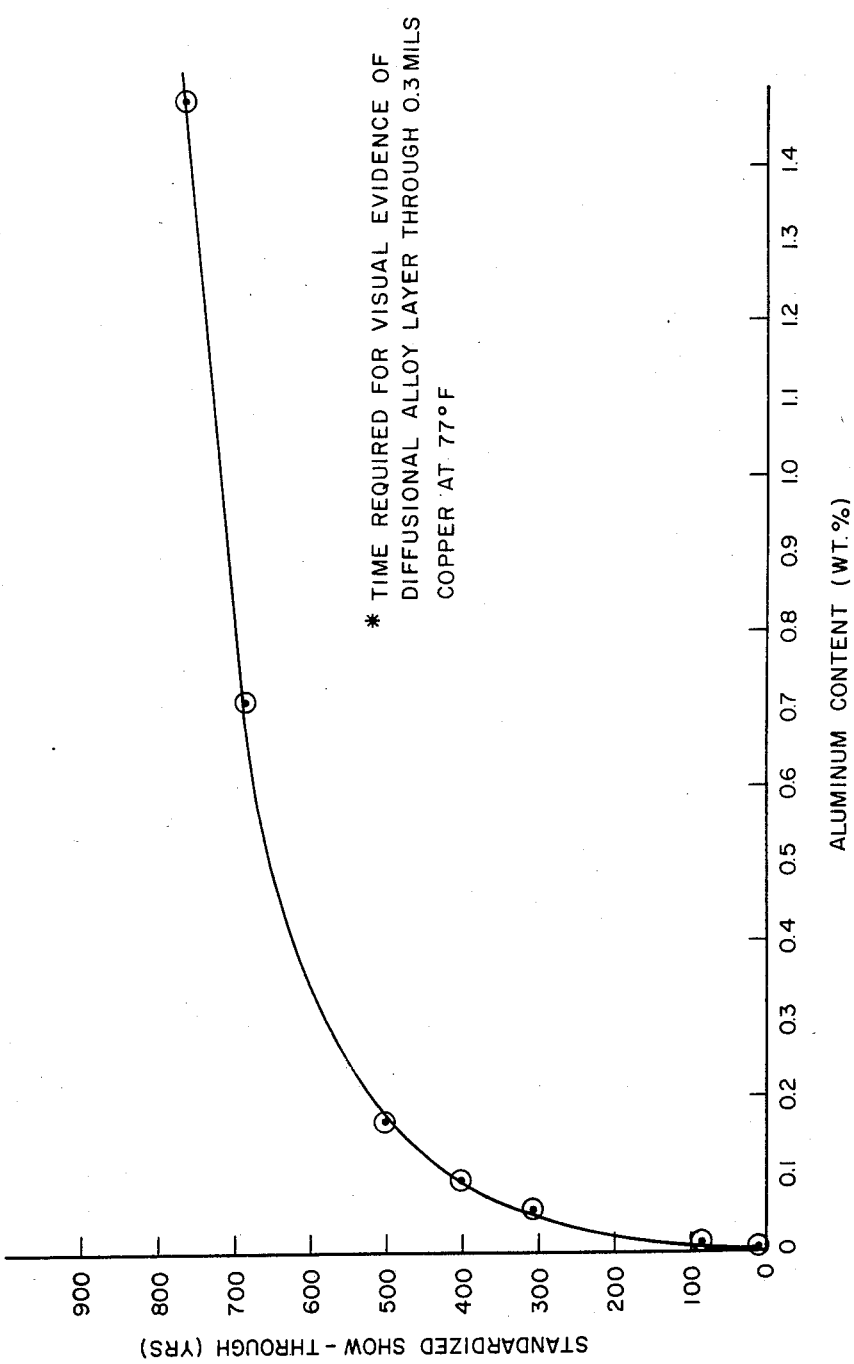
FIG. 2 is a graph showing the effect of aluminum content in zinc alloys on diffusion rates as indicated by standardized show-through time.
Figure 3:
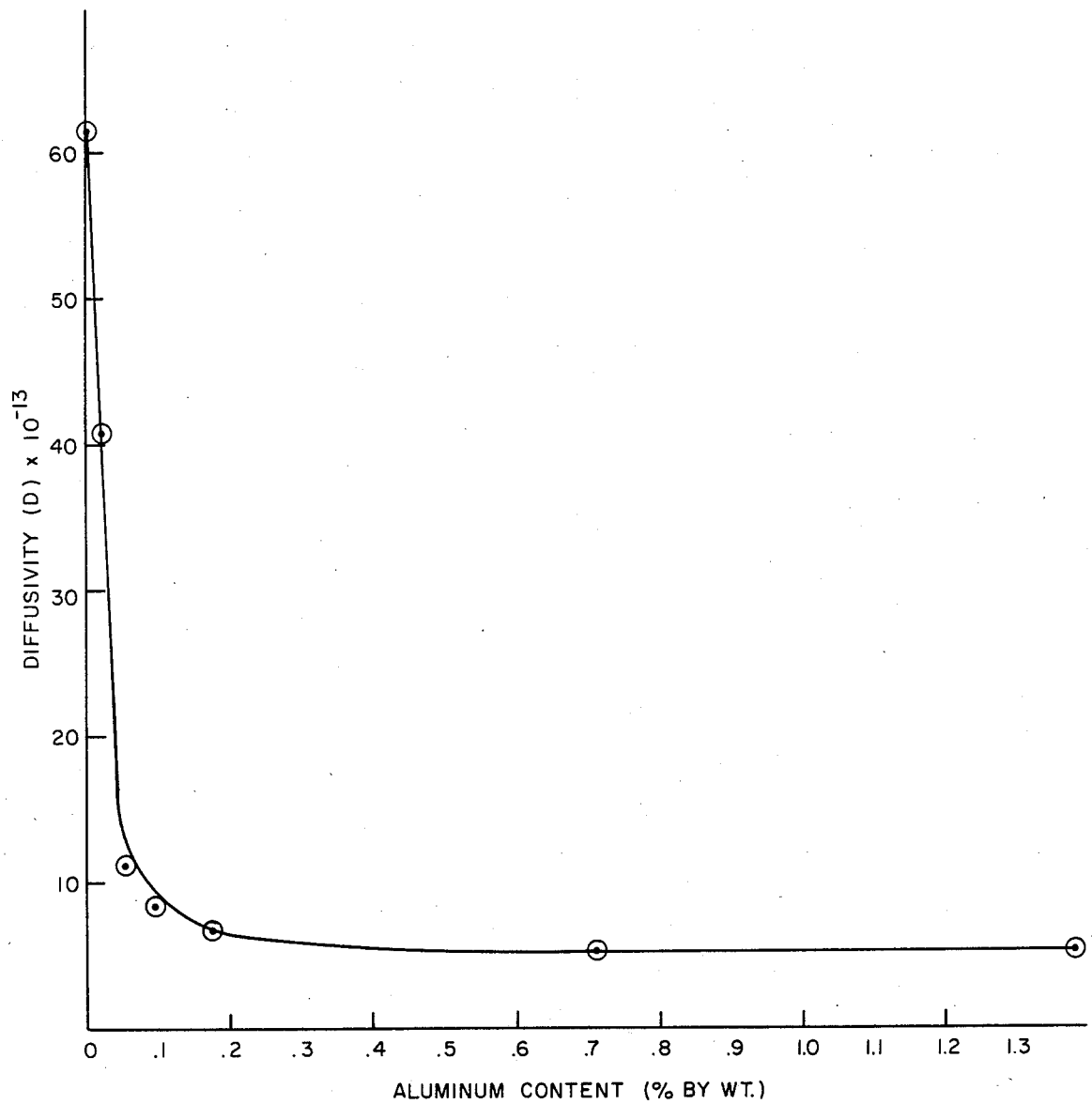
FIG. 3 is a graph showing the effect of aluminum content in zinc alloys on copper/zinc diffusivity.

The effect of aluminum content in zinc alloys on zinc show-through times and diffusivities were plotted and shown in FIGS. 2 and 3. The data presented in Table III and FIGS. 2 and 3 shows the profound effect of very small additions of aluminum to zinc alloys on slowing down the rate of copper-zinc interdiffusion. This data shows the impact of small amounts of aluminum in zinc alloys and its positive role in developing zinc alloys which are to be copper plated or copper-nickel-chromium plated. The attainment of slower diffusion rates through the alloying with small amounts of aluminum is particularly important in zinc alloys, especially those used to produce rolled strip or sheet.

It is to be understood that the foregoing description has been given only by way of illustration and example, and that changes and alterations in the present disclosure which will be readily apparent to one skilled in the art, are contemplated or within the scope of the present invention which is only by the claims which follow.

TABLE III

| ZINC ALLOY NUMBER | COPPER PLATE THICKNESS MILS | TIME FOR ZINC TO SHOW-THROUGH (HRS.) AT CONSTANT TEST TEMPERATURE °F. | | | | DIFFUSIVITY $D \times 10^{-13}$ D | CALCULATED SHOW-THROUGH TIME AT 77° F. AND WITH 0.3 MIL COPPER PLATE YEARS |
|---|---|---|---|---|---|---|---|
| | | 230° F. | 250° F. | 265° F. | 280° F. | | |
| 1 | 0.403 | 393 hrs. | 172 hrs. | 130 hrs. | 87 hrs. | 216 | 16 |
| 3 | 0.429 | 556 hrs. | — | 165 hrs. | 97 hrs. | 62 | 57 |
| 4 | 0.415 | 631 hrs. | — | 168 hrs. | 106 hrs. | 41 | 86 |
| 5 | 0.372 | 828 hrs. | — | 196 hrs. | 113 hrs. | 11.4 | 309 |
| 6 | 0.388 | 1020 hrs. | — | 240 hrs. | 143 hrs. | 10.8 | 327 |
| 7 | 0.385 | 1029 hrs. | — | 240 hrs. | 137 hrs. | 8.7 | 404 |
| 8 | 0.423 | 1344 hrs. | 459 hrs. | 313 hrs. | — | 6.9 | 511 |
| 9 | 0.367 | 1747 hrs. | 580 hrs. | 426 hrs. | — | 5.1 | 686 |

TABLE III-continued

| ZINC ALLOY NUMBER | COPPER PLATE THICKNESS MILS | TIME FOR ZINC TO SHOW-THROUGH (HRS.) AT CONSTANT TEST TEMPERATURE °F. | | | | DIFFUSIVITY $D \times 10^{-13}$ D | CALCULATED SHOW-THROUGH TIME AT 77° F. AND WITH 0.3 MIL COPPER PLATE YEARS |
|---|---|---|---|---|---|---|---|
| | | 230° F. | 250° F. | 265° F. | 280° F. | | |
| 10 | 0.406 | 2004 hrs. | — | 577 hrs. | 262 hrs. | 5.6 | 633 |
| 11 | 0.384 | 2012 hrs. | 605 hrs. | 578 hrs. | 247 hrs. | 4.6 | 766 |

What is claimed is:

1. A metal article comprising a zinc base alloy having a copper overlayer, said overlayer being in direct contact with the zinc base, said zinc base alloy consisting essentially of between about 0.02 and about 1.5 weight percent aluminum and the balance zinc.

2. A metal article as recited in claim 1 wherein the zinc base alloy includes magnesium in an amount up to about 0.05 weight percent.

3. An article as recited in claim 1 wherein the overlayer of copper is bonded to the zinc base alloy.

4. An article as recited in claim 1 wherein the zinc base alloy includes copper in an amount of about 0.1 to 0.8 weight percent.

5. An article comprising a zinc base alloy having a copper-containing overlayer thereon, said overlayer being in direct contact with the zinc base alloy, said zinc base alloy consisting essentially of about 0.1 to about 0.8 weight percent copper, about 0.01 to 1.5 weight percent aluminum, about 0.003 to 0.05 weight percent magnesium, the balance zinc.

6. An article comprising a zinc base alloy having a layer of copper thereover deposited by electrodeposition, said zinc base alloy consisting essentially of between about 0.1 to about 0.8 weight percent copper, about 0.5 to 1.5 weight percent aluminum, about 0.003 to 0.5 weight percent magnesium, the balance zinc.

7. A zinc alloy having a copper layer coated thereon, said zinc alloy consisting essentially of about 0.1 to about 0.8 weight percent copper, about 0.1 to 1.5 weight percent aluminum, about 0.003 weight percent magnesium, the balance zinc.

8. An article as recited in claim 7 wherein the copper layer has a thickness of about 0.003 inch or less.

9. A blank suitable for minting into coins or similarly disc-shaped articles comprising a core formed of a zinc alloy material consisting essentially of about 0.1 to about 0.8 weight percent copper, about 0.01 to 1.5 weight percent aluminum, about 0.003 to 0.5 weight percent magnesium, the balance zinc, a continuous layer of copper completely encasing said core, said layer having a thickness of about 0.0002 to about 0.004 inch.

10. The blank of claim 9 wherein said zinc alloy contains about about 0.1 or less weight percent aluminum, about 0.004 to about 0.01 weight percent magnesium, the balance zinc.

11. A method for reducing the diffusion between a copper electroplate in direct contact with a zinc metal comprising alloying said zinc metal to form a zinc alloy consisting essentially of between about 0.01 and 1.5 weight percent aluminum and at least one metal selected from the group consisting of copper and magnesium, and the balance zinc, electroplating copper upon the zinc alloy to form a bond between said electroplated copper and said zinc alloy, and allowing the zinc alloy to remain in intimate contact with said electroplated copper.

12. A method for reducing the diffusion between a copper electroplate bonded to an underlying zinc metal comprising alloying said zinc metal to form a zinc alloy consisting essentially of about 0.1 to about 0.8 weight percent copper, about 0.01 to 1.5 weight percent aluminum, about 0.004 to about 0.5 weight percent magnesium, the balance zinc, electroplating copper upon the zinc alloy to form a bond between said electroplated copper and said zinc alloy, and allowing the zinc alloy to remain in intimate contact with said electroplated copper.

13. A method for reducing the diffusion between a copper layer and a zinc base metal, said layer being in direct contact with the zinc base metal, said method comprising incorporating in said zinc base metal aluminum to form an alloy consisting essentially of about 0.01 to 1.5 weight percent aluminum and the remainder zinc, electroplating copper upon the zinc alloy to form a bond between said electroplated cooper and said zinc alloy, and allowing the zinc alloy to remain in intimate contact with said electroplated copper.

* * * * *